United States Patent

Mertzweiller et al.

[15] 3,691,101
[45] Sept. 12, 1972

[54] HIGH ACTIVITY ZEOLITE CATALYSTS AND THEIR PREPARATION

[72] Inventors: Joseph K. Mertzweiller, Baton Rouge, La. 70815; Neville L. Cull, Baker, La. 70714

[73] Assignee: Esso Research and Engineering Company

[22] Filed: June 5, 1970

[21] Appl. No.: 43,984

[52] U.S. Cl. .................................252/455 Z, 23/111
[51] Int. Cl. ........................B01j 11/40, C01b 33/28
[58] Field of Search.......................252/455 Z, 431 R; 23/111–113

[56] References Cited

UNITED STATES PATENTS

| | | | |
|---|---|---|---|
| 3,384,572 | 5/1968 | Myers et al. | 252/455 X |
| 3,442,795 | 5/1969 | Kerr et al. | 252/455 X |
| 3,449,070 | 6/1969 | McDaniel et al. | 252/455 X |
| 3,415,759 | 12/1968 | Johnson | 252/455 |
| 3,113,931 | 12/1963 | Voltz | 252/442 |
| 3,562,351 | 2/1971 | Mertzweiller et al | 260/683.15 |
| 3,536,632 | 10/1970 | Kroll | 252/430 |

*Primary Examiner*—C. F. Dees
*Attorney*—Pearlman and Schlager and Llewellyn A. Proctor

[57] ABSTRACT

Hydrocarbon feeds are converted into hydrocarbon products by contact at suitable conversion conditions with new and novel, highly active catalyst composites formed from crystalline alumino-silicate zeolites within which transition metal cations are deposited, i.e., exchanged or impregnated, and then activated, in novel manner. The catalysts are formed by ion-exchanging, or impregnating, an alkali, alkaline earth or other form, e.g., a hydrogen form, of the crystalline aluminosilicate zeolite base, natural or synthetic, with salt solutions of Group IB, IVB, VB, VIB, VIIB and VIII metals; heat-treating, or pretreating, to form chemical complexes at the ion-exchange sites, to drive off moisture and absorbed oxygen, and then activating and further modifying the complex by contacting the so-formed composite with covalent or liquid soluble forms, and preferably monomeric forms, of organometallic compounds capable of entering into the pores of the zeolite, and wherein the metal constituent is selected from Groups I, II and III, and preferably Groups IA, IIA and IIIA, of the Periodic Chart of the Elements. Preferably, the so-activated composite is then treated in the presence of hydrogen at elevated temperature to fix the catalyst in its most active and stable form. Suitably, a mixed metal modification of the catalyst can be formed by use of an additional metal component, or components, which can be contacted and composited with the catalyst before or after, but preferably before, the activation and fixation steps.

11 Claims, No Drawings

HIGH ACTIVITY ZEOLITE CATALYSTS AND THEIR PREPARATION

High activity hydrocarbon conversion catalysts, sulfided and nonsulfided forms, have been prepared by activating conventional supported forms of transition metals with organometallic compounds wherein the metallic constituents were selected from Groups I, II and III of the Periodic Chart of the Elements, e.g., metal alkyls or aluminum alkyl compounds such as disclosed in Applications Ser. No. 674,097, filed Oct. 9, 1967, now abandoned, Ser. No. 674,098, filed Oct. 10, 1967, now abandoned, Ser. No. 683,493, filed Nov. 6, 1967, now U.S. Pat. No. 3,562,351, issued Feb. 9, 1971, Ser. No. 761,792, filed Sept. 23, 1968, now abandoned, Ser. No. 761,793, filed Sept. 23, 1968, now abandoned, Ser. No. 1281 filed Jan. 7, 1970 and Ser. No. 1282 filed Jan. 7, 1970, the subject matter of which is herewith incorporated and made of reference.

Catalysts formed with supported transition metals activated, e.g., with Group III metal alkyl compounds such as a trialkyl aluminum compound, have proven useful for hydrocarbon conversion reactions, e.g., hydrogenation, dimerization, and the like. Catalysts such as described in the above-identified applications, however, have proven most effective, these being characterized as heterogenous species formed by a sequence of steps involving heat treatment, or pretreatment, to form well dispersed complexes on the surface of the support and to remove water and adsorbed oxygen, treatment with the metal alkyl and subsequent "-fixation" in an additional step involving treatment at elevated temperature in the presence of hydrogen. Such species which were formed ab initio by impregnation of the supports with aqueous solutions of the transition metals have proven outstanding, and such catalysts have proven most effective where the catalyst support was alumina, particularly a pure form of activated alumina of high surface area. The reason, it is believed for the high activity of these catalysts is that the transition metals are highly dispersed on the supports, and this state of dispersion is retained at conditions wherein conventional catalysts deactivate by crystallite growth. In other words, in conventional catalysts the mobility of the transition metal is such that it is readily able to migrate on the surface and grow into larger, much less active crystallites, whereas in the more highly activated catalysts the metal alkyl compound becomes joined to the support through an oxygen atom (originally a hydroxyl group on the support surface), and this results in (1) an extremely well dispersed low valence form of the transition metal, and (2) a much more stable form of the metal which is much less able to migrate and form larger crystallites.

The activity of the catalysts of this invention is thus believed to result from (1) extremely well dispersed forms of the metal and (2) low valence forms of the metal. The dispersion and reduction of the transition metal are a result of the reductive alkylation action of the organometallic compound. The important reactions can be illustrated as follows:

-M-A- + $QR_n$ → -M-R + -$AQR_{n-1}$     (1)
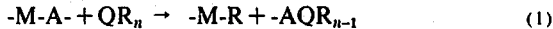
-M-R → -M-H + R     (2) or
-M-R → -M + ½ R + ½ RH     (3)
Q = Group I, II, or III metal; R = $CH_3$, $C_2H_5$, etc.

Reaction (1) is the alkylation of the transition metal species -M-A- (M = metal, A = anion, e.g., O, S, halogen, etc.). Reactions (2) and (3) are two modes of decomposition of the normally unstable transition metal alkyl; the product of this decomposition is either a metal hydride or the metal reduced by one valence unit. It is easy to see that the more the valence state of the metal is decreased (e.g., M-A bonds broken) the more the metal is dispersed, e.g., the smaller the particles of M-A remaining.

There is another reaction which is believed to be very important in the mechanism of forming these catalysts. This is the reaction of a hydroxyl group on the support with the metal alkyl compound $QR_n$ -OH + $QR_n$ → -O-$QR_{n-1}$ + RH     (4)
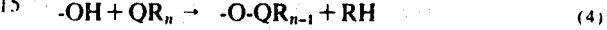

This reaction occurs whether or not transition metal is present.

However, a special feature of this invention is that of treating at high temperature in the presence of hydrogen, after the catalyst has been treated with the $QR_n$ compound, which gives the most active and stable catalysts. This high temperature hydrogen treating is believed to force the species -A-$Q_{n-1}$ (Reaction 1) and -$OQR_{n-1}$ (Reaction 4), both of which are less reactive than $QR_n$, to react as $QR_n$ reacts in Reaction (1). This leads to further dispersion of M. But the reaction of the -$OQR_{n-1}$ species (Reaction 4) can lead to formation of a low valence form of M such as $$-\text{O}-\underset{|}{\overset{R}{\text{Q}}}-\text{O}-\text{M}$$

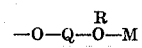

which is strongly anchored to the support through the oxygen of the hydroxyl group which reacted with $QR_n$ in Reaction (4). This is the sequence which is believed to account for the unusual stability of these catalysts.

In the prior art, it is also known to use crystalline aluminosilicate zeolites, frequently termed molecular sieves, as supports into which transition metal cations are exchanged or impregnated. These are three-dimensional silica alumina tetrahedra structures characterized by a repeating three dimensional network of large, open alumino-silicate cages interconnected with uniform openings or pores. Electrical neutrality is maintained in the unit cell structure by cations, generally alkali and alkaline earth metal cations. These cations are generally exchanged by more catalytically active species of cations as described, e.g., by reference to U.S. Pat. Nos. 3,257,310; 3,293,192; 3,384,572; 3,431,196; 3,433,589; 3,442,795; and 3,449,070 herewith incorporated by reference. Often, such structures are stabilized by steaming at temperatures ranging from about 1,000° F. to about 1,300° F., and higher, for periods ranging from about 0.5 to 4 hours, and longer. Insofar as is known, however, such composites have never been activated in the above-described manner after cation exchange or impregnation by treatment with organometallic compounds of the character described, nor was it thought possible to form very highly active compositions in such manner. Hence, the technique of aluminum alkyl activation of transition metal exchanged or impregnated crystalline aluminosilicate zeolite forms was not applicable to the important class of catalyst supports known as molecular sieves, these being particularly useful in cracking reactions.

It has been found, however, that certain transition metal forms of these crystalline aluminosilicate zeolites can be modified and activated much in the same fashion as the highly active alumina based transition metal catalysts described in the above-referenced applications. Transition metal containing crystalline aluminosilicate zeolite, e.g., cation-exchanged or transition metal impregnated species of crystalline aluminosilicate zeolite can be heat-treated, or pretreated, to form fairly well dispersed forms of transition metal complexes at the cation exchange sites, drive off water and absorbed oxygen, and then activated pursuant to certain prescribed conditions to further modify the complexes. The mechanism is also believed similar, or at least can be explained in the light of experimental facts. For one thing, it is found that the best catalysts are obtained when the transition metal M is exchanged into the crystalline aluminosilicate zeolite form in an aqueous medium, e.g., as a water-soluble salt, and then activated. The nature of the anion of the salts used can have a profound effect on the activity and selectivity of the catalyst. This, to use the same connotation as applied to the transition metal supported catalyst species, is believed due to the retention or lack of retention of at least a portion of the anion associated with the complex Support-O-Q-M-A wherein A is a salt anion.

The heat-modified form of transition metal exchanged or impregnated zeolite, in any regard, is activated by contact of the heat-modified composite with covalent forms, or hydrocarbon liquid soluble or vaporizable organometallic compounds, capable of entering into the pores of the cation-exchanged crystalline aluminosilicate zeolite, and containing a metal constituent selected from Group I, II and III, and preferably Group IA, IIA and IIIA, of the Periodic Chart of the Elements (Fischer Scientific Company, Periodic Chart of the Elements, printed in U.S.A., Copyright 1952).

The heat treatment, after exchange of transition metal cations at the ion-exchange sites, forms chemical complexes within the internal voids of the crystalline aluminosilicate zeolite structure, as well as on the outer surface. By subsequent treatment of the exchanged heatmodified composite with an organometallic compound, of the character described, of sufficiently small size at the conditions of treatment, the latter compound enters into the internal voids of the crystalline aluminosilicate zeolite structure via the pore opening and causes the transition metal to become activated and possibly chemically bonded through oxygen to the structure in such manner that the mobility of the transition metals is impaired, and they cease to be free to migrate and grow large crystallites. The catalysts of this invention are thus found to have unusually good sustained performance at high severity conditions, and also are reasonably active at low severity conditions. This high activity, and high activity maintenance, is believed to result from the relatively high surface area provided by the chemically modified internal voids of the crystalline aluminosilicate zeolite, and suppression of the formation of large crystallites as contrasted with conventional catalysts.

Large pore size crystalline aluminosilicate zeolite is first exchanged or impregnated with transition metal cations in accordance with the practice of this invention. Preferably, the base crystalline aluminosilicate zeolite is one having an effective pore diameter ranging at least about 10 A, and more preferably from about 10 A to about 15 A. The pore size is found to be critical, and zeolite containing pore sizes ranging considerably below about 10 A is not highly activated. This, it is believed, is due to the inability of smaller pore size zeolites to admit the activating compounds through their relatively small pores. Larger pore size zeolite can be used, though these species are not readily available. The large pore zeolite, in any regard, is exchanged or impregnated in conventional manner with solutions, preferably aqueous solutions, of salts of transition metals, providing cations selected from Groups IB, IVB, VB, VIB, VIIB and VIII of the Periodic Chart, illustrative and preferred of which are, e.g., vanadium, chromium, manganese, iron, cobalt, nickel, palladium and platinum. Groups IVB and VIB transition metals, e.g., titanium, molybdenum and tungsten, are preferably deposited, e.g., by impregnation in anionic form into the large pore zeolites. In the deposition, i.e., exchange or impregnation, preferably, a substantial portion of the original alkali or alkaline earth metal of the crystalline aluminosilicate zeolite structure is replaced by the transition metal to reduce the alkali or alkaline earth metal content, calculated as the oxide, to less than ten weight percent, more preferably to less than about 5 weight percent, and even more preferably less than 1 weight percent, based on the weight of the total composite, this including the exchanged transition metal plus the zeolite base.

The anhydrous form of the base exchanged large pore crystalline aluminosilicate zeolites can be expressed in conventional terms in moles by the formula:

$0.9 \pm 0.2\ Me_{2/n}:Al_2O_3:XSiO_2$ where Me is a transition metal cation, or cations, n is its valance, and X is a number ranging from about 2 to 14, preferably 3 to 10, and more preferably 4 to 6. Illustrative of crystalline aluminosilicate zeolites of such character are zeolite L, mordenite, faujasite and zeolite FW, which have been found to be highly active, selective and stable.

Techniques for the preparation of the large pore base crystalline aluminosilicate zeolites are well known to the art. The zeolites may occur naturally, bit it is most often preferred to produce them synthetically. Synthetic preparations involve, e.g., crystallization from reaction mixtures containing: $Al_2O_3$ as an alkali metal aluminate, alumina sol and the like; $SiO_2$ as an alkali metal silicate and/or silica gel and/or silica sol; and $Me_{2/n}O$ as an alkali or alkaline earth metal hydroxide. Careful control is kept over the alkali or alkaline earth metal oxide concentration of the mixture, as well as the proportions of silica-to-alumina and alkali or alkaline earth metal-to-silica, the crystallization period, etc., to obtain the desired product.

The crystalline aluminosilicate zeolite product is washed to remove the soluble alkali metal silicates, and then ion-exchanged or impregnated, preferably the former, by contact with a solution containing a salt of the metal which is to be ion-exchanged with the zeolite. The exchange is preferably conducted by a series of separate contacts with fresh solution, at ambient or at elevated temperature conditions.

Mixed metal modifications of crystalline aluminosilicate zeolite have also been found to exhibit high catalytic activity, selectivity, and good activity maintenance in hydrocarbon conversion ereactions. Preferably, such mixed metal modification contains less than 10 weight percent, more preferably less than 5 weight percent, and even more preferably less than 1 weight percent, alkali or alkaline earth metals, calculated on the oxide. Preferably, also, the crystalline aluminosilicate zeolite is steamed at 1,000° F. to 1,300° F. and higher, for a period of 0.5 to 4 hours prior to desposition of transition metals. The modifications which are found most effective include, as a first component, a transition metal, preferably a Group VIII metal which is ion-exchanged into the zeolite base, and a second metal component composited therewith comprising a metal or metal compound selected from Groups IVB, VB, VIB and VIIB of the Periodic Chart. Anion forhs of the latter species of metals are preferred for use in formation of the mixed metal modifications. Illustrative of such metals in their anionic forms are, e.g., titanates, zirconates, vanadates, chromates, molybdates, tungstates and manganates. Particularly preferred embodiments of the present invention include mixed metal modifications of a crystalline alumino-silicate zeolite comprising a Group VIII nonnoble metal, particularly iron, cobalt or nickel, ion-exchanged into the crystalline aluminosilicate zeolite with subsequent contact with metals of Groups IVB, VB, VIB or VIIB in anionic form, most preferred of which are molybdenum and tungsten. The second metal can be composited with the ion-exchanged zeolite before or after the activation and fixation steps, to be subsequently described in detail, but preferably the mixed metal modification is formed prior to activation.

The transition metal modification of the crystalline aluminosilicate zeolite base is subsequently subjected to a heat treatment, or pretreatment, to form chemical complexes at the ion-exchange sites, to drive off water and absorbed oxygen. A mixed metal modification can be similarly treated with the same, and perhaps additional, effect. Suitably, the transition or mixed metal modification is heated in a stream of inert or nonreactive gas at temperatures ranging from about 300° F. to about 1,200° F., and preferably from about 400° F. to about 800° F., at 20 to 29 inches of mercury for periods ranging from about 0.5 to about 4 hours, or preferably from about 1 to about 2 hours. If desired, the initial portion of the heating step can be conducted in air, but subsequently must be heated in an inert atmosphere or vacuum. On the other hand, the exchange can be accomplished at the elevated temperatures while moisture is stripped from the support with nitrogen, or other nonreactive gas. If desirable, the exchange and heat treating steps can be conducted in multiple stages. For example, the exchange can be effected and the base then dried, or partially dried, at low temperature. The base can then be again exchanged and again dried, or partially dried. The heat treatment per se can also be conducted in multiple stages, if desired. The exchanged base, to facilitate handling, can thus be subjected to a first rather mild heat treatment to dry the base and then, in a second step, to a more severe treatment to produce the desired chemical change.

The transition, or mixed metal, heat-modified base is then activated by treatment with a covalent form of an organo-metallic compound, suitably a liquid hydrocarbon soluble, or volatilizable organometallic compound, a metallic constituent of which is selected from Group I, II and III, or more preferably from Group IA, IIA and IIIA; and even more preferably is one having an atomic number of from 3 to 50. The activating agent employed, which must be capable of entering into the pores of the base at the conditions of operation, can be represented by the formula:

$$QR_nX_m$$

wherein Q is a Group, I, II or III metal, and preferably a Group IA, IIA or IIIA metal; R is an organo or a monovalent hydrocarbon radical; X is a halogen, e.g., chlorine, bromine or fluorine, and n and m are integers ranging from 1 to 3, and in summation equal to the valence of Q. The R groups can be the same or different, substituted or unsubstituted, saturated or unsaturated, and can be alkyl, aryl, alkaryl, aralkyl, or cycloalkyl. Such groups include, for example, methyl ethyl, n-propyl, isopropyl, isobutyl, n-amyl, isoamyl, heptyl, n-octyl, n-dodecyl, and the like; 2-butenyl, 2-methyl-2-butenyl and the like; cyclopentyl-methyl, cyclohexyl-ethyl, cyclohexyl-propyl and the like; 2-phenylethyl, 2-phenylpropyl, 2-naphthylethyl, methyl naphthylethyl and the like; cyclopentyl, cyclohexyl, 2,2,1-bicycloheptyl and the like; methylcyclopentyl, dimethylcyclopentyl, ethylcyclopentyl, methylcyclohexyl, dimethylcyclohexyl, 5-cyclopentadienyl, and the like; phenylcyclopentyl, and the like. In general, any R group can contain up to about 20 carbon atoms, but preferably contain up to about 12 carbon atoms. Alkyls are the most preferred groups, and preferably these groups contain no more than about four carbon atoms. Q is preferably selected from such metals as lithium, beryllium, boron, aluminum, zinc, gallium and indium.

Preferred activating agents are the trialkyl or alkyl halide substituted products of aluminum, and zinc, particularly those containing alkyl groups having from one to about 12 carbon atoms, and more preferably from one to about 4 carbon atoms, especially linear alkyl groups. These compounds, including boron compounds, are monomeric at the most desired activation conditions, and readily enter into the pores of the crystalline aluminosilicate zeolite. This is particularly so where the steric hindrance offered by the hydrocarbon moities is not too great. Exemplary of such compounds are trimethyl aluminum, triethyl aluminum, diethyl zinc, tri-n-butyl aluminum, tri-isobutyl aluminum, tributyl boron, diethyl aluminum chloride, diethyl aluminum fluoride, ethyl zinc chloride, diethyl boron fluoride, and the like. Certain volatile or hydrocarbon soluble hydrides, e.g., the various known hydrides of boron, are also suitable activating agents. The Grignard reagents can also be used.

In conducting the activation step the dried, deoxygenated transition or mixed metal modification of the catalyst is treated with the organometallic compound in situ or ex situ, but is most conveniently conducted in situ in the reaction vessel in which the catalyst is to be used. The treatment can be conducted with pure or diluted metal alkyl compounds in liquid or vapor phase, preferably in liquid phase. Liquid phase activation is conducted by dissolving the covalent form of the organometallic compound, preferably a metal alkyl compound, in a hydrocarbon liquid solvent, dilute or concentrated, e.g., to the point of saturation. Hydrocarbon diluents of the paraffinic, cycloparaffinic or aromatic types are entirely suitable and the metal alkyl compound may be present in concentrations of 5 percent to 50 percent in the diluent. A solution of about 20 percent aluminum triethyl in a paraffinic diluent is a preferred activation system.

The activation reaction is quite exothermic. It may be desirable to remove the heat of activation. The temperature during the activation step is maintained in the range of from about 0° F. to about 500° F., preferably from about 100° F. to about 300° F. Considerable gas liberation occurs during activation and these gases are normally vented from the system. The activation is allowed to proceed until reaction is no longer observed, generally 0.5 hr. to 12 hours in contact with at least some excess of metal alkyl compound. Vapor phase activation is conducted in generally the same manner by contact with the catalyst at temperatures ranging from about 200° F. to about 600° F., and preferably from about 300° F. to about 400° F., in one or a series of treating steps.

The treatment of the catalyst after the metal alkyl activating step is most important and greatly influences performance of the catalyst in subsequent reactions. This operation is termed "fixation" because it functions to (1) fix the catalyst in a stable heterogeneous form, and (2) to promote the formation of the active sites involving alkyl metal and transition metal.

After the catalyst has been treated with the metal alkyl compound, the solution can be drawn off and stored for use in future activations; it will normally contain excess metal alkyl compound and may also contain small concentrations of soluble complexes of the transition metal. The catalyst at this stage is unstable and may not be truly heterogeneous, i.e., some hydrocarbon-soluble forms may be present. The catalyst is fixed by heating at elevated temperatures of from about 300° F. to about 1,500° F., preferably from about 400° F. to about 1,200° F. The fixation is preferably carried out in the presence of hydrogen which is an essential reactant. Fixation can also be carried out in the presence of unreactive or inert gases such as nitrogen, helium, argon, and the like, if some hydrogen is contained therein, or if it is generated in situ within the reaction. The function of hydrogen during fixation is believed to be further reduction of the transition metal compound to a valence state in which it can easily react with the metal alkyl moiety which now becomes attached to the molecular sieve base. The metal alkyl treatment only partially reduces the transition metal compound, reducing primarily those chemical bonds by which the transition metal compound may have attached itself to the surface of the sieve. These are believed the bonds which are most difficult to reduce by hydrogen. Thus it is seen that the two principal functions of the metal alkyl treating are (1) to reduce the chemical bonds which attach the transition metal compound to the surface of the sieve and thus render the transition metal compound more readily reducible by hydrogen, (2) to form a site (alkyl metal atom chemically bonded to the surface of the sieve) with which a reduced valence form of the transition metal can attach itself chemically, and (3) to give a very highly dispersed form of the low valence transition metal. The fixation step can therefore be considered as a treatment to complete the chemical reaction occurring as described under items (1) and (2) above.

The time required for fixation will depend to a considerable extent on the temperature, generally less time being required at higher temperatures. Typical fixation times range from about 1 hour to about 100 hours. With certain transition metals, the activity of the catalysts of this invention continue to increase or at least remain constant as fixation time is increased at high temperature, e.g., at 1,200° F. in the presence of hydrogen. This provides evidence that the catalysts of this invention differ from conventionally prepared catalysts which can be shown to decrease in activity as hydrogen treating severity is increased. Such behavior is attributed to growth of large metal crystallites. The catalysts of this invention, however, show little or no crystallinity for comparable severity hydrogen treating.

Fixation requirements can also be influenced by hydrogen pressure. Normally atmospheric or near atmospheric pressure is used for fixation. This corresponds to hydrogen partial pressures of 0.5 to 1.5 atmospheres. However, increased hydrogen partial pressure, up to 100 atmospheres or greater, can be used. The higher hydrogen partial pressures will generally decrease the time-temperature requirements for fixation.

The fixed catalyst is then ready for contact with hydrogen or hydrogen-containing gases in a suitable reaction system for producing cracking and hydrogenation (or dehydrogenation) reactions. These catalysts, especially those initially formed by use of aqueous solutions of the salts of transition metals such as cobalt, iron, molybdenum, tungsten, vanadium, chromium, manganese, rhenium and platinum, have proven themselves to be of exceptionally high activity. This is quite surprising. Olefins, whether singular or multiple linkage compounds, aliphatic or cyclic, whether added ab initio to the process or generated in situ within the cracking reactions, have been readily hydrogenated to paraffins, or dimerized, and aromatic compounds have been saturated to produce the corresponding cycloalkane. Acetylenic compounds, whether of singular or multiple linkage, or aliphatic or cyclic, can also be hydrogenated. In fact, catalysts formed by impregnation of the support with salts of cobalt and iron in the initial step have proven highly satisfactory despite the normally low activity attributed to cobalt and the even lower activity attributed to iron for producing hydrogenation reactions. Reactions based on the conversion of fuel hydrocarbons also include catalytic cracking, hydrocracking, reforming, hydrodesulfurization and isomerization.

The invention will be more fully understood by reference to the following selected nonlimiting examples which illustrate its more salient features.

For use in the following examples, metal-exchanged type 13Y zeolite (sodium) is first prepared by slurrying the Y Zeolite with an aqueous solution of the chloride salt of the metal. The slurry is then heated on an electric hot plate to 175° F. for 4 ½ hours with constant stirring. At the end of this time, the exchanged zeolite is separated from the aqueous solution by filtration, washed three times by stirring in separate batches of water, and the water removed by filtration after each water-wash.

The washed zeolite is then retreated with fresh solution and the whole process repeated. The zeolite is given a total of five such treatments, and thereafter is washed thoroughly until subsequently free of chloride ions, and then partially dried.

EXAMPLES 1–3

Portions approximating fifty grams of the dry, light green colored calcined zeolite 13Y, in which about 60–65 percent of the original Na ions is replaced by cation exchange by $Ni^{2+}$ ions, are separately charged into a heated quartz tubular reactor and thermally treated in situ at 800° F. for two hours in a stream of dry nitrogen. The catalyst is then cooled to 100° F. in the nitrogen. The reactor is then flooded with a 20 percent solution of a metal alkyl, in n-heptane, as identified in the table below. The temperature is increased from 100° to 400° F., as indicated below, and after 0.5 to 1 hour the excess solution is withdrawn and the catalyst dried at about 200° F. in a stream of dry, oxygen-free nitrogen. The solids resulting from the liquid phase activation range from dark gray to a gray-black in color.

| Example | 1 | 2 | 3 |
|---|---|---|---|
| Catalyst | | Nickel Faujasite | |
| Pretreatment | | Heated at 800°F. for 2 hours with $N_2$ Flow | |
| Activation Treat metal Alkyl | $BEt_3$ | $ZnEt_2$ | $AlEt_3$ |
| activation temp., °F. | 400 | 100 | 400 |
| (Liquid Phase) | — | Yes | — |
| Appearance of Activated Material | dark gray in color | Very dark gray, almost black, copious gas evolution | dark gray |

EXAMPLE 4

A 50 gram portion of the nickel exchanged faujasite, pretreated by heating for 2 hours in dry nitrogen as described in the foregoing examples is activated at 400° F. by vapor phase contact with aluminum triethyl.

In the vapor phase activation, aluminum triethyl solution is allowed to drip down onto the catalyst and out the bottom of the reactor. A nitrogen flow (vapor phase) is used to prevent any oxidation of the aluminum triethyl.

EXAMPLE 5

A 50 gram portion of nickel exchanged faujasite is pretreated and activated as in Example 4, except that boron triethyl is contacted, in vapor phase, at 450° F. with the pretreated catalyst in the activation step.

The activated catalyst is tested for hydrogenation activity. 34 Grams of the catalyst is charged to a 1-liter stirred autoclave containing 250 cc. of octene-1. Hydrogenation is carried out at 212° F. and 600 psig of hydrogen. The hydrogenation is 73 percent complete after 1 hour and 88 percent complete after 4 hours.

EXAMPLE 6

One hundred grams of ammonium-13Y molecular sieve is impregnated with a solution prepared by dissolving 19 grams of ammonium molybdate in water to make 110 cc. solution. The sieve absorbed 90 cc. of the solution. The remainder of the solution is drained off and the catalyst dried under vacuum. The catalyst contains about 11 wt. % Mo.

An electrically heated quartz tube is charged with 24.4 grams of the above catalyst and is heated overnight in dry air at 800°–810° F. The catalyst is cooled to 400° F. under a flow of helium. While maintaining a very low flow of helium through the catalyst, a 20 percent solution of triethyl aluminum in heptane is slowly dripped onto a stainless steel preheat packing above the catalyst bed. The catalyst turns dark and the temperature rises to a maximum of 460°–500° F. during the vapor phase activation. After 1 ¾ hours the $AlEt_3$ flow is stopped and the helium flow replaced by a fairly rapid flow of hydrogen. The catalyst is "fixed" in flowing hydrogen at 900° F. for 1 hour. It is total black in color and heats rapidly when exposed to air.

Twenty-two grams of the catalyst activated as described above is mixed with 250 cc. octene-1 and the mixture is hydrogenated at 300° F. and 600 psig. The octene-1 is hydrogenated at a rate of about 10 percent per hour.

A comparable catalyst not activated with triethyl aluminum but rather with hydrogen along gives essentially no hydrogenation of the olefin.

EXAMPLE 7

Fifty grams of $NH_4$-13Y sieve (14–35 mesh) is impregnated with a solution prepared by dissolving 9 grams ammonium vanadate in a mixture of 20 cc. water and 20 cc. monoethanolamine. All liquid is absorbed and the catalyst, after drying, contains 7.3 percent vanadium.

This catalyst is calcined in air, activated with triethyl aluminum and fixed in hydrogen at 900° F. as described in Example 6.

The activated catalyst (22 grams) is used to hydrogenate octene-1 (250 cc.) at 300° F. and 600 psig. The rate of hydrogenation is about 8%/hour.

EXAMPLE 8

The molybdenum-hydrogen faujasite catalyst described in Example 6 is tested for hydrocracking n-heptane at low pressure. A small continuous flow reactor is charged with 7 grams of catalyst. Normal heptane is passed over the catalyst at a rate of 1 W/Hr./W, temperature of 700° F., 200 pounds pressure and a hydrogen feed rate of 3,800 SCF/Bbl. of n-heptane. The liquid product is condensed in a dry ice cooled receiver and the total gaseous product collected over a 2-hour period. Products are analyzed by mass spectrometry.

The liquid product amounts to 62 weight percent on feed and the gaseous product (hydrogen-free) is 38 percent on feed. Of the liquid product, 71 percent is unconverted n-heptane and the remainder largely isobutane, isopentane, isohexanes with a small amount of aromatics. The gaseous product has the following distribution (hydrogen-free basis):

| | Wt. % |
|---|---|
| Methane | 28.3 |
| Ethane | 26.9 |
| Propane | 32.4 |
| Butane | 12.4 |

The catalysts can be utilized as slurries or as fixed beds, movable beds and fluidized beds, in liquid phase or vapor phase, in batch, in continuous or in staged operations. Hydrogenation reactions can be carried out at remarkably low temperature and pressures as contrasted with the more conventional catalysts, whether the reaction is conducted in liquid phase or vapor phase. Hydrogenation reactions are generally conducted at temperatures ranging from about 0° F. to about 1,000° F., and preferably at temperatures ranging from about 100° F. to about 500° F. The reactions can be conducted at lower than atmospheric pressures or at supra atmospheric pressures, but generally pressures ranging from as low as about 1 atmosphere to about 500 atmospheres can be employed. Preferably, however, pressures ranging from about 1 atmosphere to about 50 atmospheres are employed in conducting the reactions.

These catalysts are suitable for carrying out hydrogenation reactions in systems designed to handle high heats of reaction and severe contacting problems, without substantial deterioration and reparation of catalyst from the support. This is due in large part to the high stability of these catalyst, by virtue of which hydrogenation reactions can be conducted at very low hydrogen partial pressures ranging as low as from about 1 to about 200 atmospheres.

When it is desired to carry hydrogenation reactions essentially to completion, an excess of hydrogen over the stoichiometric requirement is used. This excess may vary from a few percent to several hundred or even several thousand percent. In the latter cases, the excess hydrogen is separated and recycled to the system. When it is desired to carry out partial hydrogenations, the reaction can be controlled on the basis of hydrogen concentration, e.g., mol ration of $H_2$ to feed, or reaction kinetics, e.g., using an excess of hydrogen and controlling reaction by time, temperature, $H_2$ partial pressure and the like.

Having described the invention, what is claimed is:

1. A process for forming hydrocarbon conversion catalysts which comprises
    a. exchanging the internal pore structure of a crystalline aluminosilicate zeolite support, said zeolite support having a pore size of at least about 10 Angstroms with an aqueous solution of a transition metal cation selected from Groups IB, IVB, VB, VIB, VIIB and VIII of the Periodic Chart of the Elements,
    b. heat-treating the transition metal crystalline aluminosilicate zeolite support at temperatures ranging from about 300° F. to about 1,200° F. to form chemical complexes within the internal voids of the structure,
    c. activating the heat-treated support by contact with a covalent form of an organometallic compound, a metallic constituent of which is selected from Group I, II and III of the Periodic Chart of the Elements, said compound being capable of entering into the pores of the crystalline aluminosilicate zeolite, and
    d. treating the activated support by contacting same with hydrogen at temperatures ranging from about 300° F. to about 1,500° F.

2. The process of claim 1 wherein sufficient transition metal is exchanged into the pores of the zeolite support to provide no more than about ten percent of the alkali and alkaline earth metals, calculated as the oxide, in the catalyst.

3. The process of claim 1 wherein the temperature of the heat treatment ranges from about 400° F. to about 800° F.

4. The process of claim 1 wherein the organometallic compound is represented by the formula:

$QR_nX_m$ wherein Q is a Group IA, IIA or IIIA metal, R is a monovalent hydrocarbon radical, X is halogen and n and m are integers ranging from 1 to 3, and in summation equal to the valence of Q.

5. The process of claim 4 wherein the metal constituent Q has an atomic number ranging from 3 to 50.

6. The process of claim 5 wherein the metal constituent Q is aluminum.

7. The process of claim 1 wherein the organometallic compound is an aluminum alkyl.

8. The process of claim 1 wherein the activation with the organometallic compound is conducted at temperatures ranging up to about 600° F.

9. The process of claim 8 wherein the activation step is conducted in liquid phase at temperatures ranging from about 0° F. to about 500° F. for a period ranging from about 0.5 to about 12 hours.

10. The process of claim 8 wherein the activation step is conducted in vapor phase at temperatures ranging from about 200° F. to about 600° F.

11. The process of claim 1 wherein the activated support is contacted with hydrogen at temperatures ranging from about 400° F. to about 1,200° F.

* * * * *